US010401210B2

(12) United States Patent
Skowaisa

(10) Patent No.: US 10,401,210 B2
(45) Date of Patent: Sep. 3, 2019

(54) PORTABLE DEVICE FOR ORIENTING A FILL-LEVEL MEASURING DEVICE ON A CONTAINER

(71) Applicant: VEGA GRIESHABER KG, Wolfach (DE)

(72) Inventor: Juergen Skowaisa, Schiltach (DE)

(73) Assignee: VEGA GRIESHABER KG, Wolfach (DE)

(*) Notice: Subject to any disclaimer, the term of this patent is extended or adjusted under 35 U.S.C. 154(b) by 275 days.

(21) Appl. No.: 15/127,190

(22) PCT Filed: Sep. 4, 2014

(86) PCT No.: PCT/EP2014/068883
§ 371 (c)(1),
(2) Date: Sep. 19, 2016

(87) PCT Pub. No.: WO2015/139785
PCT Pub. Date: Sep. 24, 2015

(65) Prior Publication Data
US 2017/0284854 A1    Oct. 5, 2017

(30) Foreign Application Priority Data

Mar. 20, 2014 (EP) .................. PCT/EP2014/055636

(51) Int. Cl.
G01F 25/00    (2006.01)
G01C 9/02    (2006.01)
(Continued)

(52) U.S. Cl.
CPC .......... *G01F 25/0061* (2013.01); *G01C 9/02* (2013.01); *G01F 23/0076* (2013.01);
(Continued)

(58) Field of Classification Search
CPC .................................................... G01S 7/4026
See application file for complete search history.

(56) References Cited

U.S. PATENT DOCUMENTS 6,634,234 B1 * 10/2003 Haas ................. G01F 23/284
367/138
9,989,401 B2 * 6/2018 Ferraro ............... G01F 23/284
(Continued)

FOREIGN PATENT DOCUMENTS

CN    1703611 A    11/2005
CN    103348222 A    10/2013
(Continued)

OTHER PUBLICATIONS

English translation of the International Preliminary Report on Patentability and Written Opinion dated Sep. 29, 2016 in PCT/EP2014/068883.

(Continued)

Primary Examiner — Bernarr E Gregory
(74) Attorney, Agent, or Firm — Oblon, McClelland, Maier & Neustadt, L.L.P.

(57) ABSTRACT

A portable device for orienting a level measuring instrument on a container is provided. The device can be placed on a surface of the instrument. The device includes a tilt sensor configured to determine an inclination of the device and an inclination of the instrument; a processor configured to determine an alteration that is required in an orientation of the instrument on the basis of the inclination of the instrument, a dimension of the container, and a position of the instrument relative to the container, or on the basis of an angle of inclination to be set for the instrument on the container. The alteration in the orientation of the instrument can be displayed on a display device of the device. A level measuring system and a method for using a portable device (Continued)

to orient a level measuring instrument on a container are also provided.

19 Claims, 7 Drawing Sheets

(51) Int. Cl.

| | | |
|---|---|---|
| *G01S 15/88* | (2006.01) |
| *G01S 13/88* | (2006.01) |
| *G01S 7/52* | (2006.01) |
| *G01S 7/40* | (2006.01) |
| *G01F 23/296* | (2006.01) |
| *G01F 23/284* | (2006.01) |
| *G01F 23/00* | (2006.01) |
| *G01S 13/00* | (2006.01) |

(52) U.S. Cl.
CPC .......... *G01F 23/284* (2013.01); *G01F 23/296* (2013.01); *G01S 7/4026* (2013.01); *G01S 7/52004* (2013.01); *G01S 13/88* (2013.01); *G01S 15/88* (2013.01)

(56) References Cited

U.S. PATENT DOCUMENTS

| | | | |
|---|---|---|---|
| 2007/0199365 A1 | 8/2007 | Skowaisa et al. |
| 2008/0012752 A1* | 1/2008 | Okamura .............. G01S 7/4026 |
| | | | 342/165 |
| 2013/0269414 A1 | 10/2013 | Ferraro et al. |

FOREIGN PATENT DOCUMENTS

| | | |
|---|---|---|
| DE | 10 2004 041 857 A1 | 3/2006 |
| DE | 10 2010 064 394 A1 | 7/2012 |
| DE | 10 2012 108 462 A1 | 3/2014 |

OTHER PUBLICATIONS

International Search Report dated Dec. 18, 2014 in PCT/EP2014/068883.

Chip-Redaktion: "Neuve TV-Sender gefällig? Die Kostenlose Android App SatFinder unterstützt Sie bei der Ausrichtung Ihrer Satellitenschüssel," URL:http://beste-apps.chip.de/android/app/satfinder-android-app.com.ssys.satfinder/, XP055155494, May 15, 2013, 6 pages.

Chip-Redaktion: "Satellitenschüssel richtig ausrichten: Mithilfe der iPhone-app SatFinder kein Problem," URL:http://beste-apps.chip.de/ios/app/satfinder-iPhone-app.397993104/, XP055155495, Apr. 11, 2013, 6 pages.

* cited by examiner

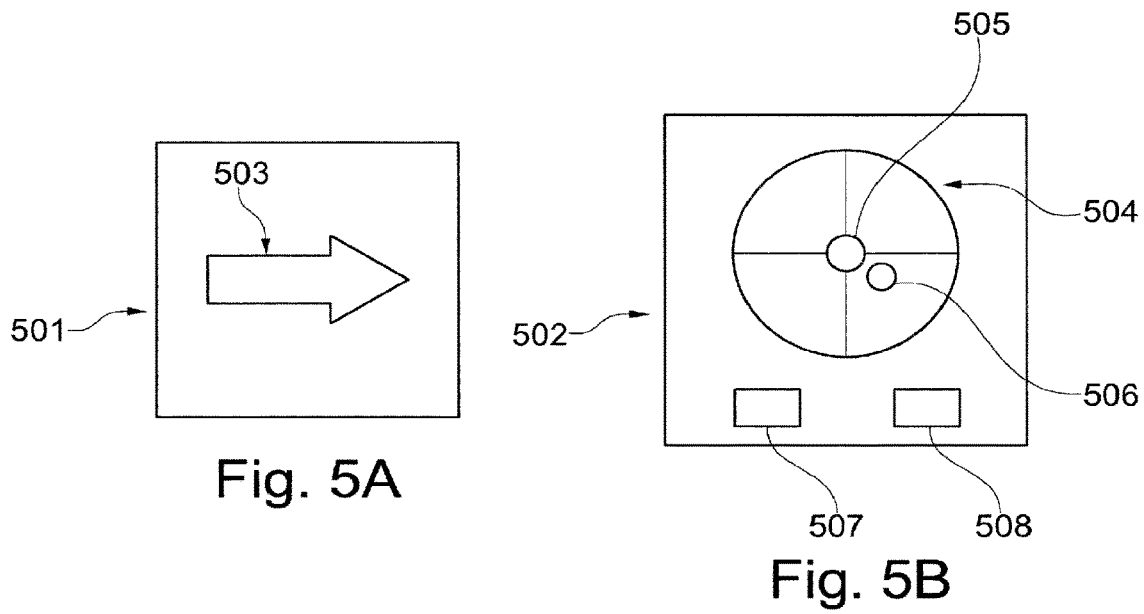
Fig. 5A
Fig. 5B
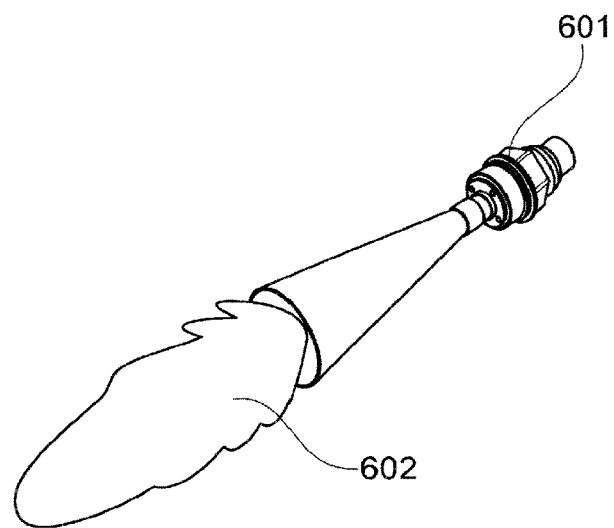
Fig. 6

PORTABLE DEVICE FOR ORIENTING A FILL-LEVEL MEASURING DEVICE ON A CONTAINER

CROSS-REFERENCE TO RELATED APPLICATIONS

This application claims the benefit of the filing date of the international application numbered PCT/EP2014/055636, which was filed on 20 Mar. 2014, the disclosure of which is included herewith by reference.

TECHNICAL FIELD

The present invention relates to orienting level measuring instruments on containers. The present invention relates in particular to a portable device, to a level measuring system, to a method, to a program element, to a computer-readable medium and to the use of a mobile terminal.

TECHNICAL BACKGROUND

In the field of industrial level measurement, it can be important to fit level measuring instruments at a particular inclination on or in a container. A bulk solid container may have a cylindrical shape with a tapered lower end, for instance. In addition, the top of the bulk solid container can contain in its centre an inlet aperture for the bulk solid. This means that a level measuring instrument may need to be laterally offset on the bulk solid container. In order that the level measuring instrument can nonetheless still measure the level right down to the lowest point of the container, the level measuring instrument needs to be installed at an inclined angle.

SUMMARY OF THE INVENTION

The object of the invention is to simplify the installation of level measuring instruments on containers.

An object is achieved by the subject matter of the independent and dependent claims. Developments and embodiments can be found in the dependent claims, the description and the figures.

A first aspect of the invention relates to a portable device for orienting a level measuring instrument mounted on or in a container, which device comprises a processor, a tilt sensor and a display device. Said processor is designed to determine an inclination of the level measuring instrument by using the tilt sensor to determine an inclination of the device when the device is touching or lying on the level measuring instrument. The processor is also designed to determine a dimension of the container and a position of the level measuring instrument relative to the container. This can be done, for instance, by user input. The processor is designed to determine a required alteration in an orientation of the level measuring instrument on the basis of the dimension of the container, the position of the level measuring instrument relative to the container and the inclination of the level measuring instrument. The processor is also designed to transmit to the display device a signal for outputting the determined required alteration in the orientation of the level measuring instrument.

In other words, a portable device is provided, for example, in the form of a tool for orienting a level measuring instrument on a container, in which device can be entered relevant information about the geometry of the container and information on the installation position of the level measuring instrument. This device can then be placed on or beside the level measuring instrument and can then use a tilt sensor to determine the inclination of the portable device and of the level measuring instrument. Then the portable device can guide the user as to how to orient the level measuring instrument in order that the level measuring instrument is oriented correctly. This allows simpler and faster installation of the level measuring instrument. It is also possible to simplify and speed up any re-orientation that may be necessary after performing maintenance on the level measuring instrument or on the container.

The sensor can be oriented directly, for example, using the tilt sensor built into the portable device and using the input of the container height and of the distance from the container centre. For this purpose, the portable device can be placed directly onto the housing or onto a surface of the level measuring instrument that is fixed relative to an antenna of the level measuring instrument or to an acoustic transducer. The level measuring instrument can be oriented very easily and quickly using the entered dimension.

In the context of the invention, the term container can mean any form of receptacle and/or storage means, stationary or mobile. The container may be a facility or a spatial area for storing a medium or a bulk solid. For example, the container may be a bulk material stockpile, a hopper or a tower, a tank, a conveyor belt, an overflow, an overflow pool or reservoir or sea basin employing wave-height metering, a feed shaft, a furnace, a pipeline or an open channel. In addition, the level measuring instrument may also be used for level measurement in the open or in observation wells.

In other words, the term container can mean a reference level or a hollow containing a reference point. For instance, the term container can mean an open or closed container for holding solids or liquids. The term container can also include a stockpile, for instance as used in coal-fired power stations, at loading sites in ports, in waste incineration plants or in mines. In this case, the level measuring instrument can be designed to measure the height of the bulk solid or product in the stockpile. The level measuring instrument can be fastened, for instance, to an apparatus provided for this purpose or to a stand. In addition, the level measuring instrument can also be mounted on a crane provided for filling or emptying the stockpile. The portable device can be used generally for orienting a level measuring instrument with respect to a reference point.

The term portable device can include, for example, a mobile terminal, a mobile computer, a mobile telecommunications device or a tablet PC. The level measuring instrument can mean an industrial level measuring instrument that can perform a non-contact level measurement using radar or ultrasound, for instance. This level measuring instrument can measure, for example, the level of a medium in a tank, in a hopper and/or in a bulk solid container. The processor of the portable device can be in the form of a microcontroller or a microchip, for example. The tilt sensor of the portable device can be in the form of an accelerometer, for example. The tilt sensor may be, for instance, a micro-electromechanical component that can determine an acceleration by measuring a capacitance and/or an electrical resistance. The display device of the portable device can be in the form of a screen or display.

The feature that the processor is designed to determine an inclination of the level measuring instrument by using the tilt sensor to determine an inclination of the device when the device is lying on the level measuring instrument can be understood to mean that the portable device is placed on a surface of the level measuring instrument for the purpose of measuring the inclination of the level measuring instrument. This surface of the level measuring instrument can be fixed relative to an antenna of the level measuring instrument. Hence by measuring the inclination of the portable device, the processor can deduce the inclination of the level measuring instrument and hence of the antenna. In other words, the processor can be designed to retrieve the inclination of the portable device from the tilt sensor. This allows the processor to determine an actual inclination or an actual angle of inclination. The actual inclination is the currently measured inclination. In addition, the processor can also be designed to retrieve information relating to an inclination of the container. For example, the inclination of the container can be input into the portable device or measured by placing the portable device on the container. The inclination can mean in this context an angle of inclination, for instance. In addition, the inclination can also be interpreted as a plane of inclination of the level measuring instrument or of the container. This plane of inclination can have two angles of inclination, for instance.

In addition, the processor can be configured to determine a dimension or a geometry of the container. The dimension of the container may be, for instance, the height and/or the diameter of the container. In addition, the processor can be configured to determine a relative position or an installation position of the level measuring instrument on the container. The position of the level measuring instrument relative to the container may be, for instance, a distance of the level measuring instrument from a centre axis of the container. For example, the processor can ascertain the position of the level measuring instrument relative to the container. The processor can ascertain the dimension of the container and the relative position of the container actively and/or passively. For instance, the dimension of the container and/or the relative position of the level measuring instrument can be input into the portable device using an input device. In addition, the processor can determine the dimension of the container and/or the relative position of the level measuring instrument by means of a database query. In other words, a setpoint inclination, i.e. an inclination to be set or an angle of inclination to be set, for the level measuring instrument can be determined indirectly. In another example, the setpoint inclination can be determined by an aiming device and/or by the actual portable device for orienting a level measuring instrument.

The processor can determine the required alteration in the orientation of the level measuring instrument for instance in the form of a difference between an existing angle of inclination or actual angle of inclination and a setpoint angle of inclination of the level measuring instrument. The setpoint angle of inclination can here refer to that angle of inclination of the level measuring instrument at which the level measuring instrument can shine a beam down to the lowest point of the container, i.e. can measure the level down to the lowest point of the container.

The actual angle of inclination can refer to the current angle of inclination of the level measuring instrument. Thus the actual angle of inclination can also refer to the current angle of inclination of the portable device when it is lying on the level measuring instrument and/or is mounted on the level measuring instrument. The container may be, for instance, a cylindrical container with a tapered lower end. In this case, the setpoint orientation of the level measuring instrument can be such that, when the level measuring instrument is oriented at the setpoint angle of inclination or at the setpoint orientation, the level measuring instrument points towards the bottom tip of the container. The direction, alignment or orientation of a level measuring instrument may be defined by a longitudinal axis of the level measuring instrument and/or by a beam direction of the level measuring instrument. In order to set the angle of inclination of the level measuring instrument on the container, the level measuring instrument can be provided with an adjustable mounting mechanism for adjusting the angle of inclination of the level measuring instrument. In this case, the processor can determine this required alteration in the orientation of the level measuring instrument by a calculation and/or by a readout from a table stored in a memory unit of the portable device, in particular by comparing the actual angle of inclination with the setpoint angle of inclination.

The signal for outputting the determined required alteration in the orientation of the level measuring instrument can be in the form of an electrical signal, for example, that comprises an instruction for such an output.

According to one exemplary embodiment of the invention, the processor is designed to transmit to the display device a signal for displaying a direction of the determined required alteration in the orientation of the level measuring instrument.

For instance, the processor can be designed to transmit to the display device a signal for displaying an arrow, along the direction of which the user is meant to tilt the level measuring instrument. It is hence easily possible to show on the display device of the portable device the direction in which the level measuring instrument is meant to be tilted.

According to another exemplary embodiment of the invention, the processor is designed to transmit to the display device a signal for displaying a bull's eye level, which shows a current orientation of the level measuring instrument relative to a required orientation of the level measuring instrument.

A bull's eye level may be a circular aiming device having a crosshair reticle located at the centre. The displayed bull's eye level can use a displayed air bubble to facilitate orientation in two dimensions in this case. The position of the displayed air bubble in the bull's eye level can here correspond to the current orientation of the level measuring instrument. The required orientation of the level measuring instrument can be represented in the form of a crosshair reticle, which is meant to be oriented in the centre of the air bubble for correct orientation of the level measuring instrument. By displaying a bull's eye level it is possible to orient the level measuring instrument accurately in two dimensions.

According to another exemplary embodiment of the invention, the processor is designed to determine a propagation in the container of a measurement signal emitted by the level measuring instrument on the basis of the dimension of the container and the position of the level measuring instrument relative to the container. The processor is also designed to transmit to the display device a signal for displaying the determined propagation in the container of the measurement signal emitted by the level measuring instrument.

In other words, the level measuring instrument may be a non-contact level measuring instrument, which may comprise an antenna. The level measuring instrument may emit the measurement signal in the form of a radar signal and/or ultrasound signal, for instance. A different beam width of the measurement signal, also known as a beam lobe, can be obtained depending on the size of the antenna or acoustic transducer of the level measuring instrument and on the frequency used.

The propagation of the measurement signal in the container can hence be taken into account for the orientation of the level measuring instrument.

According to another exemplary embodiment of the invention, the processor is designed to ascertain a parameter of the signal emitted by the level measuring instrument. The processor is also designed to simulate the propagation of the signal emitted by the level measuring instrument on the basis of the parameter of the signal emitted by the level measuring instrument, the dimension of the container, the position of the level measuring instrument relative to the container and the angle of inclination of the level measuring instrument.

In other words, the portable device can be used, for example, to perform a simulation of the radiation pattern of a radar level measuring instrument or ultrasound level measuring instrument using the beam width for the device. This beam width can be uniquely associated with the type of the level measuring instrument and the antenna size used. Using the input of the dimension of the container and the installation position of the level measuring instrument it can be very easy to draw conclusions about the possibility of spurious reflections from fitted components.

The parameter may mean in this case a beam width of the transmit lobe emitted by the level measuring instrument and/or an antenna size of the level measuring instrument, for instance. The processor can ascertain the parameter by a user input or a database query, for example. The simulation of the propagation of the measurement signal in the container can be based on a physical model, for instance. Additional information can also be included in the simulation. For instance, the simulation can take into account the container geometry. Hence, for example, a fitted component inside the container that may be the source of spurious echoes can be taken into account. Thus any potential interference effects can be identified in advance.

If fitted components are located inside the container, some of the transmit power from the level measuring instrument may be reflected at these fitted components, which can impair the level measurement. In order to obtain information about the expected spurious reflections, the portable device can simulate the propagation of the measurement signal, taking into account one or more container dimensions or parameters of the level measuring instrument, for instance the beam width of the antennas or acoustic transducer.

According to another exemplary embodiment of the invention, the device is designed to ascertain the parameter of the signal emitted by the level measuring instrument by means of an input of a serial number of the level measuring instrument or by scanning a code, preferably a barcode or a QR code.

The code may be attached to the level measuring instrument, for example. The processor of the device can also be designed to query the serial number, the barcode or the QR code in a database, and to determine from the database the relevant parameter of the level measuring instrument. The device can comprise here a scanner or a camera for scanning the barcode or the QR code. For instance, the QR code can be scanned using a camera built into the portable device for orienting the level measuring instrument.

The parameter of the signal emitted by the level measuring instrument can hence be ascertained quickly. This means that the level measuring instrument can thereby be fitted and/or oriented more quickly.

According to another exemplary embodiment of the invention, the determined propagation of the signal of the level measuring instrument comprises a transmit lobe of the level measuring instrument. The processor is also designed to transmit to the display device a signal for displaying the determined transmit lobe in the container.

The transmit lobe of the level measuring instrument can mean, for example, a cone of the measurement signal emitted by the level measuring instrument. It is thereby possible to provide a clear illustration on the display device of how the measurement signal propagates in the container depending on the inclination of the level measuring instrument.

According to another exemplary embodiment of the invention, the tilt sensor is an accelerometer.

Said accelerometer may be a micro-electromechanical component, for instance. These accelerometers can be highly reliable, relatively low cost and small in size.

According to another exemplary embodiment of the invention, the dimension of the container comprises a height of the container. Moreover, the position of the level measuring instrument relative to the container comprises a distance of the level measuring instrument from a centre axis of the container.

According to another exemplary embodiment of the invention, the device comprises an input device. In this case, the processor is designed to ascertain the dimension of the container and the position of the level measuring instrument relative to the container by means of an input into the input device.

In other words, the processor can be designed to ascertain the dimension of the container and the position of the level measuring instrument relative to the container by means of a user input.

According to another exemplary embodiment of the invention, the processor is designed to ascertain the dimension of the container and/or the position of the level measuring instrument relative to the container by scanning a code, preferably a barcode or a QR code.

This code may be attached to the container, for example. The device can thereby be configured quickly for the specific container by scanning the code attached to the container. The processor of the device can then determine by means of a database query the dimension of the container and/or the position of the level measuring instrument relative to the container that correspond to the scanned code.

According to another exemplary embodiment of the invention, the device comprises an aiming device for the purpose of orientation. The aiming device may be a camera, for instance, having a marker or having a bubble level that can be used to aim at a specified position in a container. The camera can be designed to generate an image of an interior of the container, which image is processed by a first program element of the portable device. A second program element of the portable device is designed to generate a marker, a bubble level or a crosshair reticle. The portable device or a program element superimposes the generated marker, bubble level or crosshair reticle on the generated image in order to display in the image the point at which the portable device is aimed. In addition, the aiming device may comprise a tilt sensor, which makes it possible to determine an angle of inclination of the device for orienting at the target. In this case, the processor may be designed to define a setpoint angle of inclination from the determined angle of inclination.

Another aspect of the invention relates to another embodiment of the portable device for orienting a level measuring instrument. In this embodiment, the orientation of the level measuring instrument on a container may not be restricted to orientation on a geometrical shape of the container. The device for orienting the level measuring instrument may generally specify mounting a level measuring instrument on a container in a way that is not fixed but still orients the level measuring instrument such as to allow a definable beam expansion for radiation produced by the level measuring instrument. In particular, the field device may be oriented such that a definable target inside the container can be reached by the radiation.

The device comprises a processor, a tilt sensor and a display device. The processor is designed to ascertain an inclination of the level measuring instrument by using the tilt sensor to determine an inclination of the device when the device is lying on the level measuring instrument. This means that the tilt sensor may measure an orientation and in particular an inclination of the portable device in space, which, for the case that the portable device is mounted on the field device, is related to a tilt and/or an orientation of the field device. The processor is also designed to determine an angle of inclination to be set for the level measuring instrument. The angle of inclination to be set may be referred to as the setpoint angle of inclination. The processor is also designed to determine a required alteration in an orientation of the level measuring instrument on the basis of the angle of inclination to be set for the level measuring instrument and the inclination of the level measuring instrument. For example, in order to determine the alteration, a comparison may be made between an actual angle of inclination and a setpoint angle of inclination, and a difference between the two angles of inclination calculated. The processor is also designed to transmit to the display device a signal for outputting the determined required alteration in the orientation of the level measuring instrument.

In other words, an alternative embodiment of the invention can be considered to be that the processor is designed to determine directly an angle of inclination to be set for the level measuring instrument with respect to an imaginary reference line. An imaginary reference line may be a longitudinal axis of a container. Determining the setpoint angle of inclination directly, i.e. determining directly the angle of inclination to be set, may provide the setpoint angle of inclination more quickly than, for instance, providing the setpoint angle of inclination indirectly. Providing the angle of inclination indirectly may be the case when the setpoint angle of inclination is determined from the dimension of the container. Determining directly the angle of inclination to be set means that the level measuring instrument can be oriented without the dimension of the container needing to be known. The portable device according to this aspect of the invention, however, can also have features, or be combined with features, that are described in the context of other aspects or embodiments. Thus the processor can be designed to transmit to the display device a signal for displaying a direction of the determined required alteration in the orientation of the level measuring instrument. The processor can also be designed to transmit to the display device a signal for displaying a bull's eye level, which shows a current orientation of the level measuring instrument relative to a required orientation of the level measuring instrument. This means that the manner of determining the setpoint angle of inclination may be independent of the method that is used to orient the field device in relation to the container.

The angle of inclination to be set or the setpoint angle of inclination can mean here an angle of inclination that is meant to be used for orienting the level measuring instrument on the container. In other words, the angle of inclination to be set can mean an angle of inclination that is meant to be used for orienting the level measuring instrument in relation to the container. In particular, the angle of inclination to be set may be interpreted as an angle of inclination that defines an orientation of a reference line and/or reference plane of the level measuring instrument in relation to an orientation of a reference line and/or reference plane of the container. The angle of inclination to be set can be selected, for instance, such that a signal emitted by the level measuring instrument is emitted towards a lowest point of the container or towards a reference point of a container, such as an outlet of the container, for example.

The angle of inclination to be set can be determined by the portable device. For example, the portable device may comprise an aiming device, which can be used to aim at or target the desired point of the container, towards which point the level measuring instrument is meant to be oriented. The desired point can be a reference point of the container, for instance the lowest point of the container, the point of the container furthest from a container cover or from a container aperture, or an outlet of the container.

The processor of the portable device can be designed to use as the angle of inclination to be set, a current angle of inclination of the portable device when the portable device is aimed at the desired point. The current angle of inclination may thus be obtained at the instant when the aim is on the desired point. The processor can read out the current angle of inclination of the portable device, for example, when a control element, for instance a switch or trigger button, on the device is actuated. The control element may also be a voice-based and/or gesture-based control element. This means that gesture control and/or voice control can also be used to define the current angle of inclination as the angle of inclination to be set. Actuating the control element can also initiate saving and/or transmitting the current angle of inclination. This current angle of inclination may be used directly as the setpoint angle of inclination without dimensions of the container being evaluated for this purpose. It may be necessary, however, to perform fixed conversions of the current angle of inclination into the setpoint angle of inclination because, for example, the bearing of the tilt sensor may not coincide with the target direction.

The processor may be designed, for example, to use a first program element to determine the angle of inclination to be set, and to use a second program element to determine the required alteration in the orientation of the level measuring instrument. In addition, the first program element can comprise a first interface, and the second program element can comprise a second interface. The first program element and the second program element can communicate with one another or transfer data to the other program element in each case via the first interface and second interface. For example, the first program element can transfer the angle of inclination to be set via the first interface and second interface to the second program element for determining the required alteration in the orientation.

The angle of inclination to be set can also be determined by a second device, which can be fitted on the container instead of the level measuring instrument and can be controlled remotely by the portable device. In this case, the second device can transmit the current angle of inclination to the portable device. The two devices may be separate devices. Alternatively, the two devices may be integrated in a single device. In particular, it may be possible that the same tilt sensor is used during orientation both for determining the setpoint angle of inclination and for determining the actual angle of inclination.

The portable device described in this context can simplify and/or facilitate the installation of a level measuring instrument that is meant to be fitted on a wall or side wall above head height.

According to another embodiment, the device contains a camera for capturing an image, and a control element. The processor is designed to generate in the image a target marker or a bubble level for aiming at a desired point of the container. The processor is also designed to transmit to the display device a signal for displaying the image containing the target marker. The processor is also designed to use, on actuation of the control element, a current angle of inclination of the portable device as the angle of inclination to be set.

In other words, the aiming device described above can be implemented using the camera of the portable device. The target marker may be a crosshair reticle displayed in the image, for example. The processor can also be designed to use image stabilization algorithms to minimise camera shake in the image. This allows the angle of inclination to be set to be determined more accurately.

Another aspect of the invention relates to a level measuring system comprising a portable device described in the context of the present invention and a level measuring instrument having a mounting device for the portable device.

This mounting device for the level measuring instrument can be in the form of a stop edge against which the portable device can be placed. The mounting device can also be in the form of a clamping mechanism into which the portable device is clamped. The position of the portable device relative to the level measuring instrument can be fixed by this means. By virtue of the fixed orientation of the portable device with respect to the level measuring instrument, the processor is able to deduce the inclination of the level measuring instrument from the inclination of the portable device.

Another aspect of the invention relates to a method for using a portable device to orient a level measuring instrument on a container. Said method comprises the step of the portable device ascertaining a dimension of the container and a position of the level measuring instrument relative to the container, or the portable device determining an angle of inclination to be set for the level measuring instrument on the container. The method also comprises the step of ascertaining an angle of inclination of the level measuring instrument by using the portable device, which is lying on the level measuring instrument, to measure an angle of inclination. The method additionally comprises the step of the portable device determining an alteration in an orientation of the level measuring instrument on the basis of the dimension of the container, the position of the level measuring instrument relative to the container and the angle of inclination of the level measuring instrument, or on the basis of the angle of inclination to be set and the angle of inclination of the level measuring instrument. The method also comprises the step of the portable device outputting the calculated alteration in the orientation of the level measuring instrument.

Said steps of the method can be performed in the sequence given, in a different sequence or in parallel. This method can be performed, for example, by a portable device described in the context of the present invention. Features and advantages described in connection with the device also apply in connection with the method.

Another aspect of the invention relates to a program element which, when executed by a processor, instructs the processor to perform a method according to a method described in the context of the present invention.

The program element may be, for example, a computer program, an update to a computer program or an application on a tablet PC or on a mobile communications device or smartphone.

Another aspect of the invention relates to a computer-readable medium on which is stored a program element which, when executed by a processor, instructs the processor to perform a method as described in the context of the present invention.

Another aspect of the invention relates to the use of a mobile terminal to determine a required alteration in an orientation of a level measuring instrument on a container.

Another aspect of the invention relates to the use of a mobile terminal to determine an angle of inclination to be set for a level measuring instrument on a container. In one example, the mobile terminal may load an application or app in order to be able to execute the method according to the invention.

In this case, the mobile terminal may be in the form of a portable device, a mobile computer, a tablet PC or a smartphone.

Further features, advantages and possible uses of the invention also appear in the following description of the embodiments and in the figures. All the features described and/or depicted therein form individually and in combination the subject matter of the invention irrespective of how they are combined in the individual claims or the dependency references thereof.

BRIEF DESCRIPTION OF THE FIGURES

FIGS. 5A and 5B each show a display on a display device of a portable device according to an embodiment of the invention.

FIG. 6 shows the propagation of a measurement signal according to an embodiment of the invention.

The figures are schematic and are not shown to scale. Where the same reference signs in different figures are mentioned in the following description, they denote the same or similar elements. The same or similar elements may also be denoted by different reference signs, however.

DETAILED DESCRIPTION OF EMBODIMENTS

Figure 1:
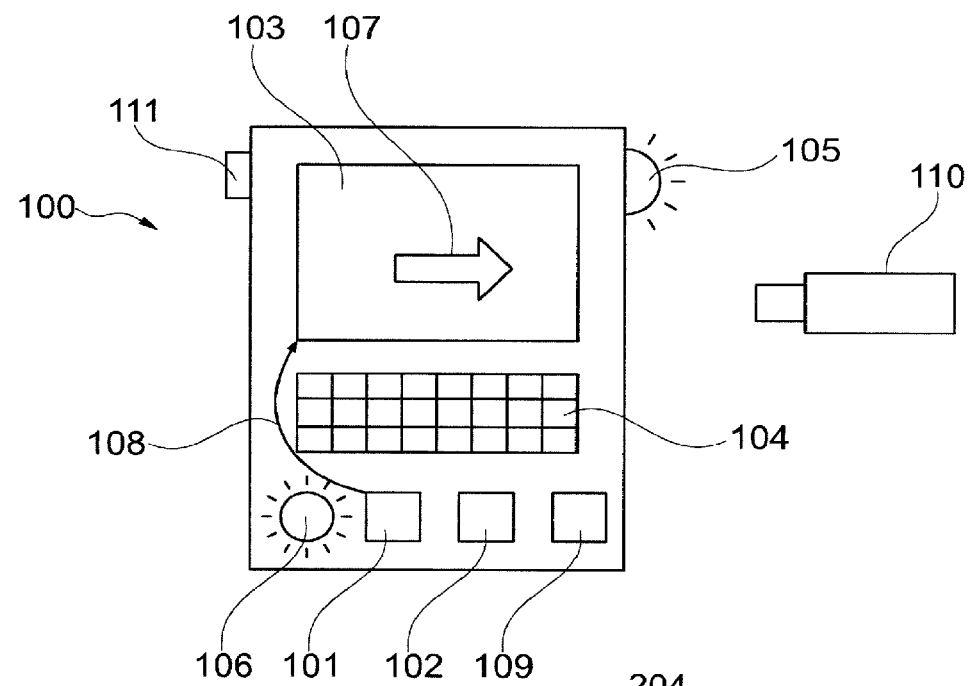
FIG. 1 shows a portable device according to an embodiment of the invention.

FIG. 1 shows a portable device 100 for orienting a level measuring instrument on a container. The portable device 100 comprises a processor 101, a tilt sensor 102 integrated in the portable device, and a display device 103.

The processor 101 of the portable device 100 is designed to ascertain an inclination of the level measuring instrument by using the tilt sensor 102 to determine an inclination of the portable device 100 when the portable device 100 is lying on the level measuring instrument. The processor 101 is also designed to ascertain a dimension of the container and a position of the level measuring instrument relative to the container. Said determination of the dimension of the container and of the position of the level measuring instrument relative to the container can be performed, for example, by a user input by means of the input device 104, which in this embodiment is in the form of a keyboard. It is also possible to determine the dimension of the container and/or the position of the level measuring instrument relative to the container by scanning a code by means of the scanner 105, which in this embodiment is in the form of a camera or a barcode scanner. In a memory unit 109 of the portable device 100 can be stored a database in which various container geometries, dimensions of containers and relative positions for installed level measuring instruments are stored and associated with a particular code. Once the code has been scanned, the processor 101 can query in the database stored in the memory unit 109 the dimension of the container and/or the position of the level measuring instrument relative to the container.

The processor 101 is also designed to determine a required alteration in an orientation of the level measuring instrument on the basis of the dimension of the container, the position of the level measuring instrument relative to the container and the inclination of the level measuring instrument. In order to determine the required alteration, an angle of inclination to be set or a setpoint angle of inclination may be compared with a current angle of inclination or an actual angle of inclination. The setpoint angle of inclination can be determined from the dimension of the container, whereas the actual angle of inclination may be determined essentially directly by the tilt sensor 102. The processor 101 is also designed to transmit to the display device a signal 108 for outputting 107 the determined required alteration in the orientation of the level measuring instrument. For instance, the processor 101 can transmit an electrical signal 108 to the display device 103. Based on the signal 108, the display device can display an arrow 107, for example, indicating the direction in which the level measuring instrument is meant to be tilted in order to be oriented correctly. The portable device can also comprise a loudspeaker 106, which outputs the required alteration in the orientation of the level measuring instrument by an acoustic signal. The acoustic signal may consist in an output tone becoming louder or softer, for example, when the level measuring instrument reaches the correct orientation.

Figure 10:
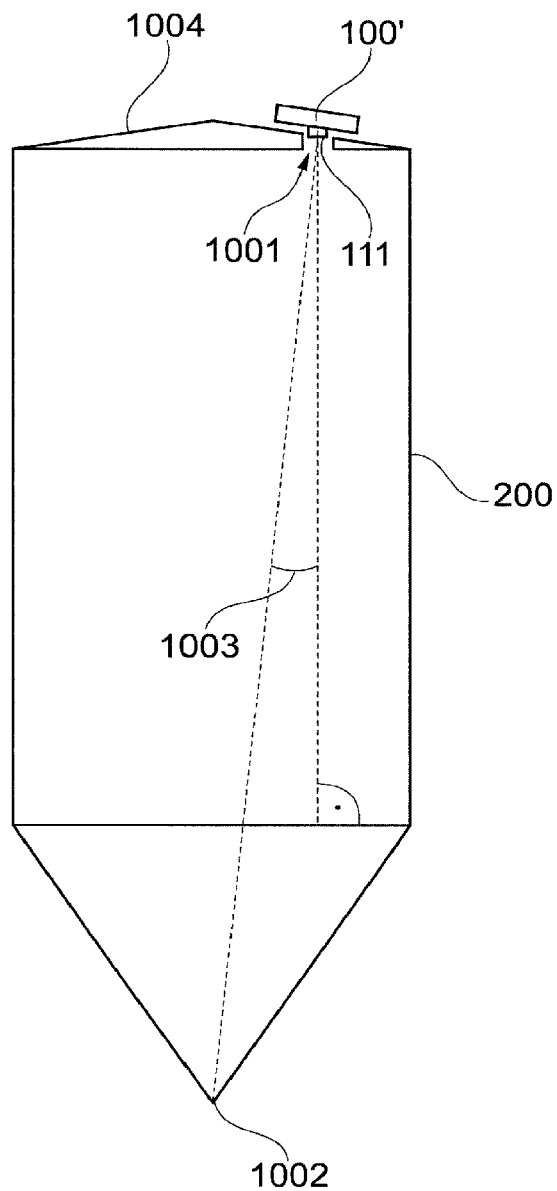
FIG. 10 shows a container comprising a portable device according to an embodiment of the invention.

Alternatively, the processor 101 is designed to determine directly an angle of inclination to be set for the level measuring instrument, as described by way of example in the context of FIG. 10. Then the processor 101 can determine a required alteration in the orientation of the level measuring instrument on the basis of the angle of inclination to be set for the level measuring instrument and the current inclination of the level measuring instrument.

In other words, instead of using the dimension of the container, the required alteration in the orientation of the level measuring instrument can be calculated by directly comparing the angle of inclination to be set with the current angle of inclination.

The angle of inclination to be set can be determined by the portable device 100. The portable device can comprise a camera 111 for this purpose, which can be used to generate an image for aiming at a desired point of the container. The processor 101 can also be designed to generate a target marker in the image in order to be able to aim at the desired point using the target marker. When the aim is on the desired point, the processor can read the current angle of inclination from the tilt sensor 102 and use this angle as the angle of inclination to be set.

For the case in which the angle of inclination to be set, or in other words the setpoint angle of inclination, is determined indirectly, e.g. by ascertaining the dimension of the container, the camera 111 can be omitted.

FIG. 1 also shows a computer-readable medium 110 according to an embodiment of the invention, in which medium is stored a program element that instructs the processor 101 of the portable device 100 to perform the method according to the invention.

Figure 2:
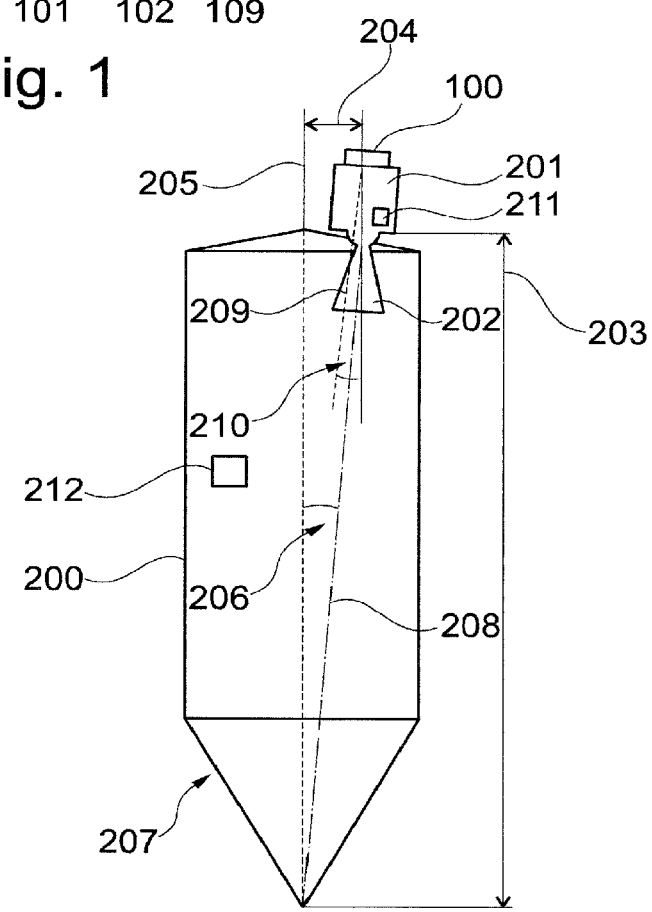
FIG. 2 shows a level measuring system and a container according to an embodiment of the invention.

FIG. 2 shows a container 200 and a level measuring system comprising a level measuring instrument 201 and a portable device 100 according to an embodiment of the invention. The container 200 is a bulk solid container, for instance, which has a cylindrical shape with a tapered end 207. This container 200 is designed to be rotationally symmetrical about the centre axis 205. In addition, the container 200 has a height 203. A level measuring instrument 201 is fitted on the container 200 at a distance 204 from the centre axis 205 or reference line 205 of the container 200. The reason for this may be that the top of the container 200 has in its centre an inlet aperture of the container 200. The level measuring instrument 201 already has the correct angle of inclination 206 in this figure, for which the measurement signals emitted by the antenna 202 of the level measuring instrument 201 can be emitted down to the lowest end of the container 200. This allows the level in the container 200 to be determined down to the lowest tip of the tapered end 207 of the container 200. The correct angle of inclination 206 equals arctan [(distance 204)/(height 203)]. In the figure, the dashed line 208 denotes the alignment or orientation of the level measuring instrument or more specifically the direction of propagation of the measurement signal emitted by the level measuring instrument 201. This orientation 208 of the level measuring instrument may coincide with a longitudinal axis of the level measuring instrument. The portable device 100 can be used, for example, to orient, or to set the orientation 208 of, the level measuring instrument 201. For this purpose, the portable device 100 is placed on a surface of the level measuring instrument 201, which is fixed relative to the antenna 202 of the level measuring instrument 201 in a known relationship. In this case, the supporting surface of the portable device 100 is perpendicular to the antenna 202 or more precisely to the emitted signal from the antenna 202. The dashed line 209 represents here the orientation or the inclination of the portable device. The angle 210 equals the angle of inclination of the portable device 100. Since the portable device 100 lies on a surface of the level measuring instrument 201, which surface is fixed in relation to the emitted measurement signal from the level measuring instrument 201, the angle of inclination 206 of the level measuring instrument can be deduced from the angle 210. The relationship between the angle of inclination 210 of the portable device 100 and the angle of inclination 206 of the level measuring instrument 201 may be different depending on the seating or supporting surface of the portable device 100.

It should also be pointed out that because of the simplified two-dimensional representation, only one angle of inclination is shown and described for the portable device and for the level measuring instrument in each case. In three dimensions, however, the respective inclinations of the portable device and of the level measuring instrument can also have two angles of inclination in each case.

A code 212 is arranged on the container 200, and a code 211 is arranged on the level measuring instrument 201, which codes are in the form of a barcode or a QR code for example. The user can thereby use the portable device 100 to scan the code 212 and/or the code 211 in order to orient the level measuring instrument. The portable device 100 can hence be configured for the container 200 and/or for the level measuring instrument 201. Then, if the portable device 100 is lying on the level measuring instrument 201, the display device of the portable device 100 can show how the level measuring instrument is meant to be oriented correctly.

Figure 3:
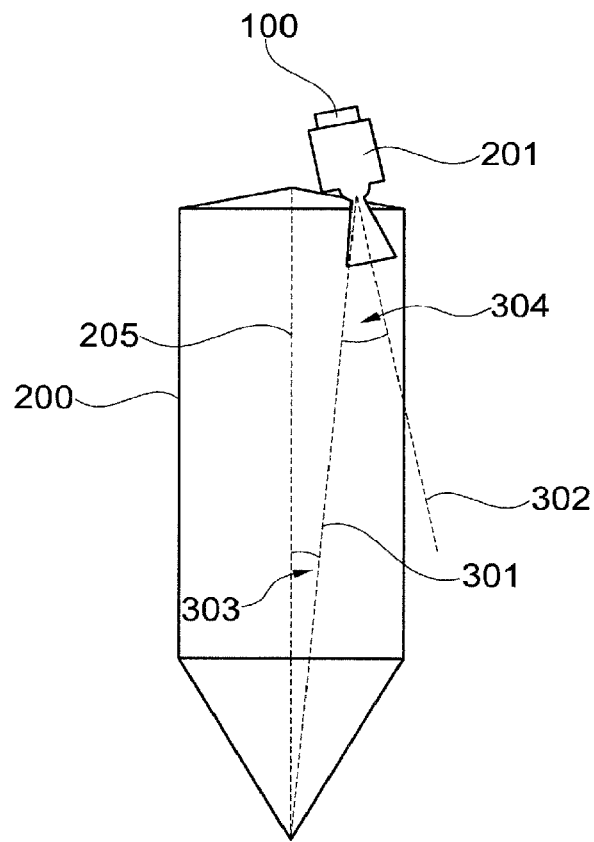
FIG. 3 shows a level measuring system and a container according to an embodiment of the invention.

FIG. 3 shows a container 200 and a level measuring system comprising a level measuring instrument 201 and a portable device 100 according to an embodiment of the invention. In this case, the level measuring instrument does not yet have the correct orientation. For the sake of simplicity, this figure shows only the orientations or angles of inclination of the level measuring instrument 201 but not those of the portable device. In addition, certain details may have been exaggerated in order to illustrate the substantive matter.

The axis 205 again denotes the centre axis of the container. The axis 302 denotes the current orientation or the actual orientation of the level measuring instrument 201. The axis 301 in turn denotes the correct or required orientation of the level measuring instrument, for which the level measuring instrument is able to determine the level in the container 200 down to the lowest point of the tapered end. The angle 303 equals the required angle of inclination of the level measuring instrument, i.e. the setpoint angle of inclination. Thus the level measuring instrument 201 must be tilted through the angle 304 in order to have the required orientation or the correct orientation. In other words, the angle 304 corresponds to the required alteration in the orientation of the level measuring instrument. The display device of the portable device 100 can hence display information that guides the user to tilt the level measuring instrument through the angle 304 towards the centre of the container.

Figure 4:
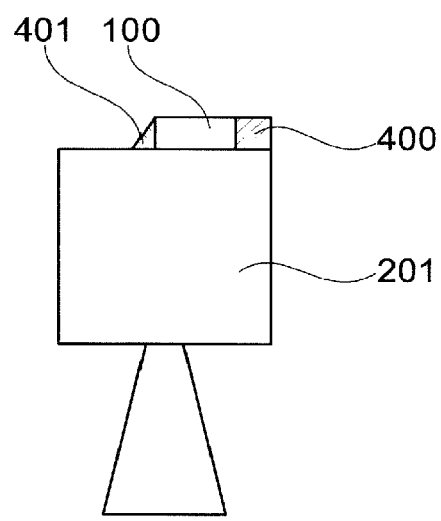
FIG. 4 shows a level measuring system according to an embodiment of the invention.

FIG. 4 shows a level measuring system according to an embodiment of the invention. The level measuring system comprises a level measuring instrument 201 and a portable device 100. The level measuring system here comprises a mounting device 400, 401 for the portable device 100. In this embodiment, the mounting device is in the form of a stop edge 400 comprising a clamping mechanism 401. The portable device 100 can be clamped thereby between the edge 400 and the clamping mechanism 401, with the result that the portable device 100 has a fixed orientation with respect to the level measuring instrument 201. It is hence possible to deduce the angle of inclination of the level measuring instrument 201 from the angle of inclination of the portable device 100.

FIGS. 5A and 5B each show a display of an output on a display device of a portable device according to an embodiment of the invention. It should be mentioned here that these displays are merely examples and shall not be deemed to have a limiting effect.

FIG. 5A shows a simple display 501 in the form of an arrow 503 of the required alteration in the orientation of the level measuring instrument. This arrow 503 guides the user to tilt the level measuring instrument in the direction of the arrow 503. The size of the arrow 503 can depend on the size of the required angle of inclination, for example. In other words, the arrow 503 can be shown smaller, for instance, if the level measuring instrument needs only a small inclination.

FIG. 5B shows a display 502 in the form of a bull's eye level 504. The bull's eye level 504 here comprises a crosshair reticle 505 and an air bubble 506. The level measuring instrument must now be tilted such that the air bubble 506 lies inside the crosshair reticle 505 or in the centre of the crosshair reticle 505. In addition, the display 502 may also contain angle values 507 and 508, which equal the required angles of inclination.

FIG. 6 shows the propagation of a measurement signal 602 emitted by an antenna of a level measuring instrument, according to an embodiment of the invention. This measurement signal 602 can be simulated by a portable device in this case. Various parameters of the level measuring instrument 601 can be included in this simulation, for instance the beam width of the measurement signal 602 and/or the size of the antenna of the level measuring instrument 601.

Figures 7A, 7B:
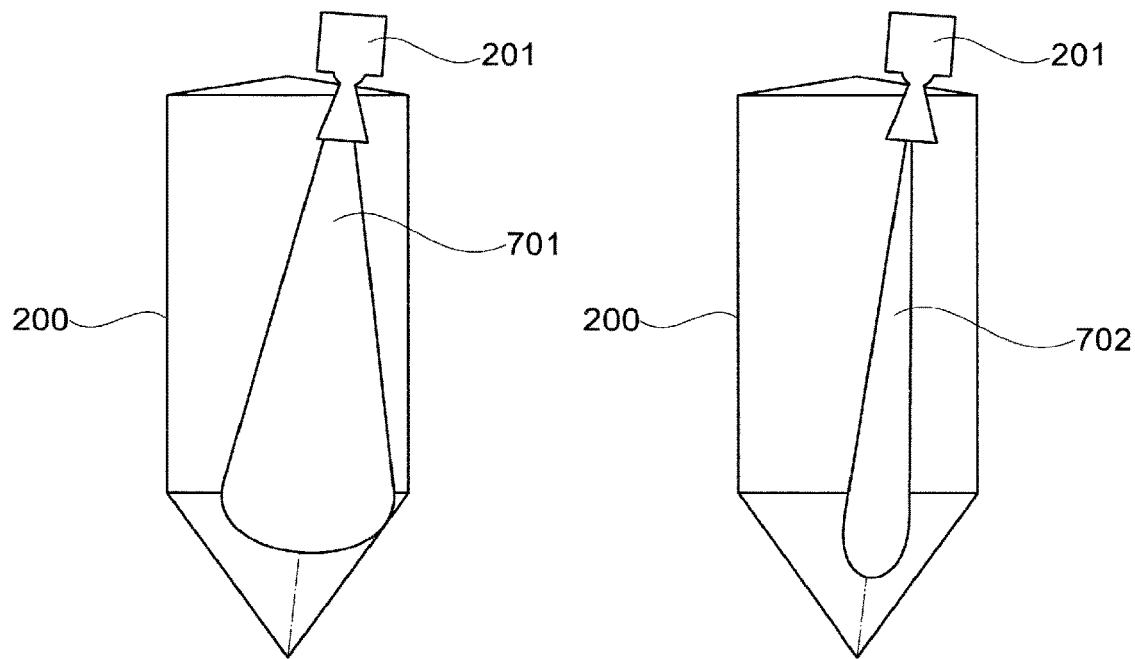
FIGS. 7A and 7B each show the propagation of a measurement signal in a container according to an embodiment of the invention.

FIGS. 7A and 7B each show the propagation of a measurement signal 701, 702 in a container 200 according to an embodiment of the invention. In this embodiment, the measurement signal 701 emitted by the level measuring instrument 201 has in FIG. 7A a larger beam width than the measurement signal 702 emitted by the level measuring instrument 201 in FIG. 7B.

Figure 8:
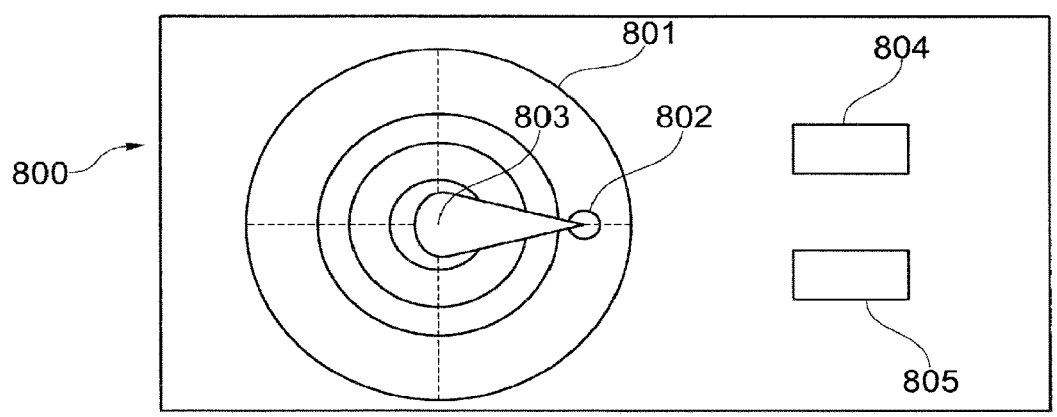
FIG. 8 shows an image on a display device according to an embodiment of the invention.

FIG. 8 shows an output of a display device of a portable device according to an embodiment of the invention. The output 800 displays a cross section 801 of the container. It also displays the position of the level measuring instrument 802 relative to the container 801. In addition, it displays the simulated propagation of the measurement signal 803, which propagation depends on the inclination of the level measuring instrument. The level measuring instrument can thereby be tilted such that the measurement signal has the required propagation. In addition, the output 800 can display the height of the container 804 and the lateral offset of the level measuring instrument from the centre axis of the container 805.

Figure 9:
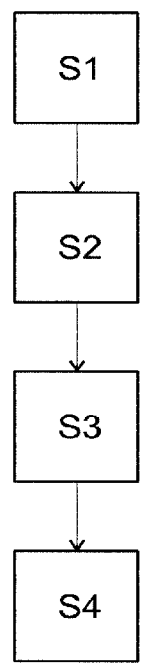
FIG. 9 is a flow diagram of a method according to an embodiment of the invention.

FIG. 9 shows a flow chart for a method for using a portable device to orient a level measuring instrument on a container according to an embodiment of the invention. Said method comprises the step S1 of a portable device ascertaining a dimension of the container and a position of the level measuring instrument relative to the container, or the portable device determining an angle of inclination to be set for the level measuring instrument on the container. The method also comprises the step S2 of ascertaining an angle of inclination of the level measuring instrument by using the portable device, which is lying on the level measuring instrument, to measure an angle of inclination. The step S3 is also performed of the portable device calculating an alteration in an orientation of the level measuring instrument on the basis of the dimension of the container, the position of the level measuring instrument relative to the container and the angle of inclination of the level measuring instrument, or on the basis of the angle of inclination to be set and the angle of inclination of the level measuring instrument. The method also comprises the step S4 of the portable device outputting the calculated alteration in the orientation of the level measuring instrument.

According to one embodiment of the invention, the method comprises performing the angle measurement, in which measurement a mobile alignment tool or a portable device, e.g. a mobile phone, a tablet or another mobile or portable device, having integral camera, integral tilt sensor and an aiming device, e.g. a crosshair reticle on a screen, a camera viewfinder or the like, is positioned over the installation point of the sensor or level measuring instrument on the container. Once the aiming device or the camera is aimed at the target, the measured angle is stored in the mobile alignment tool or in the portable device.

The method also comprises fitting the sensor or level measuring instrument, which involves installing the sensor or level measuring instrument on the installation point.

The method then proceeds according to the method for orienting the sensor or the level measuring instrument, in which method for orienting the sensor or level measuring instrument, the mobile alignment tool or the portable device is placed on the fitted sensor or on the level measuring instrument. The sensor or the level measuring instrument is then aligned, e.g. tilted and/or rotated, until the angle of the sensor or of the level measuring instrument matches the stored angle for the mobile alignment tool or for the portable device. The sensor or the level measuring instrument is then fastened or fixed in place.

FIG. 10 shows a container 200 comprising a portable device 100' according to an embodiment of the invention. The portable device 100' is arranged on an aperture 1001 of the container in order to determine an angle of inclination 1003 to be set for a level measuring instrument on the container 200. The level measuring instrument is subsequently mounted on the aperture 1001 of the container. Although the device 100' is shown lying on the cover 1004 of the container 200, the device 100' may also be oriented freely in relation to the container 200 in order to allow a good aim at the desired point 1002. In one example, the device 100' may have substantially the same design as the device 100.

The camera 111 is used to capture an image of the container interior, in which a target marker is shown so that it is possible to aim at a desired point 1002 of the container 200. The desired point 1002 is, for example, the lowest point of the container 200. When the aim is on the desired point 1002 of the container 200, by actuating a control element, the angle of inclination can be read from the tilt sensor of the portable device and used as the angle of inclination to be set or setpoint angle of inclination for the level measuring instrument.

Figure 11:
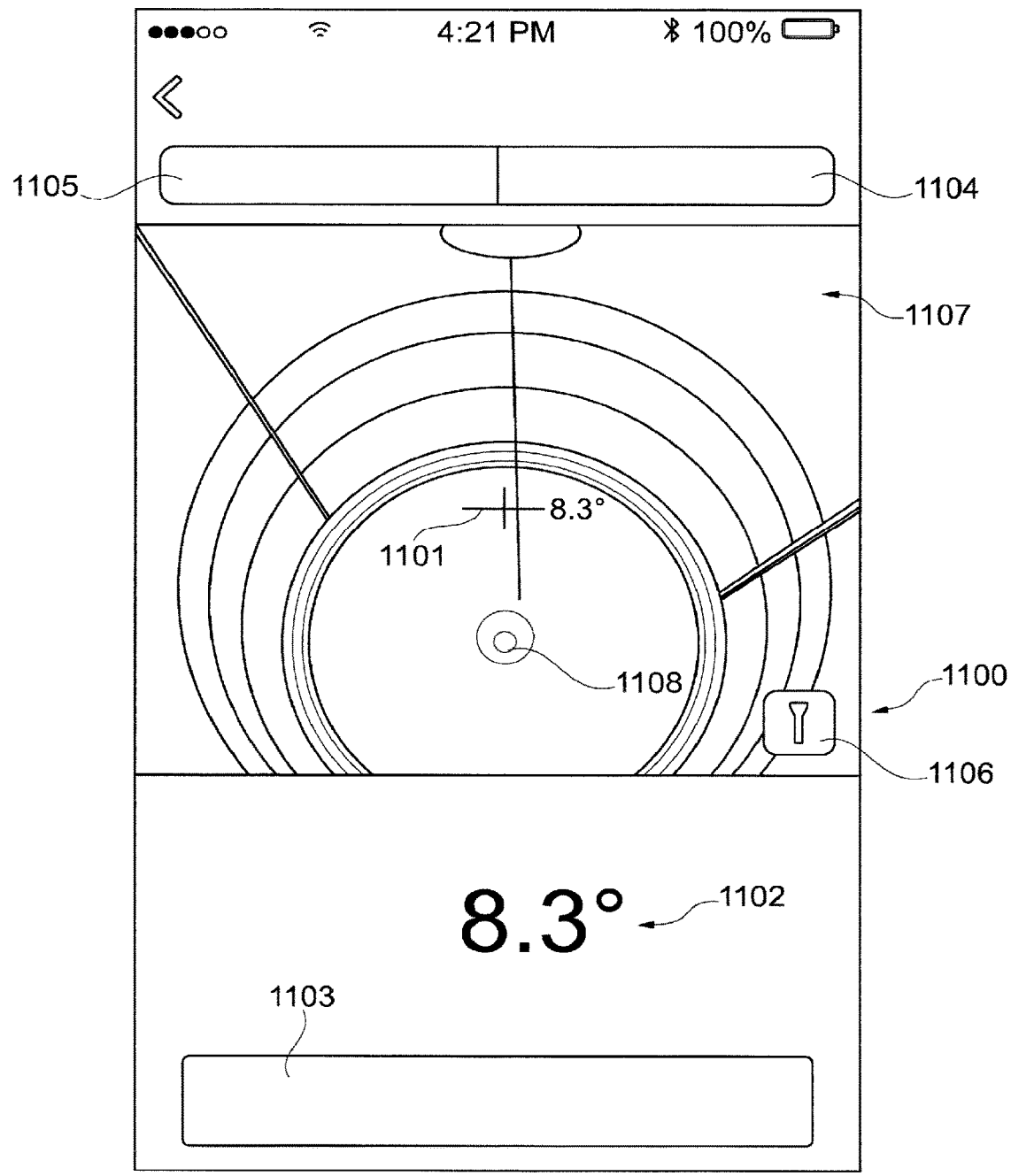
FIG. 11 shows an image output displayed on a display unit of a portable device according to an embodiment of the invention.

FIG. 11 shows an image output 1100 displayed on a display unit of a portable device according to an embodiment of the invention. The image output displays a user interface of a program element for determining an angle of inclination to be set for a level measuring instrument on a container. The user interface is embodied, for example, as a user interface for a portable device comprising a touchscreen.

The user interface comprises an image 1107 of the container interior captured by a camera of the portable device, which image 1107 comprises a target marker or a crosshair reticle 1101 for the purpose of aiming at a desired point. The captured image 1107 shows a two-dimensional representation of a three-dimensional container interior, for instance of a hopper. The container can also be another form of receptacle, reference plane and/or storage means, however. For instance, the container need not necessarily have a cover and/or side walls. The image 1107 and the target marker 1101 can be generated independently of one another, for example by different devices and/or program elements, and superimposed. The image also displays a reference point 1108 towards which the level measuring instrument is meant to be oriented. In this case, the reference point 1108 may be a lowest point of the container and/or a drain outlet of the container. In order to determine the angle of inclination to be set, the target marker 1101 must be aimed at the reference point 1108. Once the target marker 1101 is aimed at the reference point, in other words the aim is on the reference point 1108, the current angle of inclination can be read from the field 1102, and by actuating the control element 1103 can be stored and/or used as the angle of inclination to be set.

The user interface also comprises a control element 1103 for using the current angle of inclination of the portable device as the angle of inclination to be set for the level measuring instrument on the container. The field 1102 here displays the current angle of inclination of the portable device. The user interface also comprises another control element 1106 in order to actuate a lighting element, e.g. a light-emitting diode, of the portable device to illuminate the container interior when capturing the image.

In addition, the user interface comprises a control element 1105 for actuating a function for inputting a dimension of the container, and a control element 1104 for actuating the function for determining the angle of inclination to be set, which function is actuated in FIG. 11. The function for inputting the dimension of the container and the function for determining the angle of inclination to be set can hence be used as alternatives for determining the required orientation of the level measuring instrument.

In addition, it should be mentioned that the terms "comprising" or "having" do not exclude any other elements, and "a" or "an" does not rule out more than one. It should also be pointed out that features that have been described with reference to one of the above embodiments or examples can also be used in combination with other features of other embodiments or examples described above. Reference signs in the claims shall not be deemed to have a limiting effect.

The invention claimed is:

1. A portable device for orienting a level measuring instrument on a container, comprising:
   a processor;
   a tilt sensor;
   a display device; and
   a control element,
   wherein the control element is configured to actuate a function for determining an inclination of the level measuring instrument to be set, and
   wherein the processor is configured to:
      determine an inclination of the level measuring instrument by using the tilt sensor to determine an inclination of the device when the device is placed onto a surface of the level measuring instrument or of a mounting device for the level measuring instrument,
      determine a dimension of the container and a position of the level measuring instrument relative to the container,
      perform the function to determine the inclination of the level measuring instrument to be set, to determine a required alteration in an orientation of the level measuring instrument on the basis of the dimension of the container, to determine the position of the level measuring instrument relative to the container, and to determine the inclination of the level measuring instrument, and transmit to the display device a signal to output the determined required alteration in the orientation of the level measuring instrument.

2. The portable device according to claim 1, wherein the processor is further configured to transmit to the display device a signal to display a direction of the determined required alteration in the orientation of the level measuring instrument.

3. The portable device according to claim 1, wherein the processor is further configured to transmit to the display device a signal to display a bull's-eye level, which shows a current orientation of the level measuring instrument relative to a required orientation of the level measuring instrument.

4. The portable device according to claim 1, wherein the processor is further configured to:
determine a propagation in the container of a measurement signal emitted by the level measuring instrument on the basis of the dimension of the container and the position of the level measuring instrument relative to the container, and
transmit to the display device a signal to display the determined propagation in the container of the measurement signal emitted by the level measuring instrument.

5. The portable device according to claim 4,
wherein the determined propagation of the measurement signal of the level measuring instrument comprises a transmit lobe of the level measuring instrument, and
wherein the processor is further configured to transmit to the display device a signal to display the transmit lobe in the container.

6. The portable device according to claim 1, wherein the processor is further configured to:
ascertain a parameter of a measurement signal emitted by the level measuring instrument, and
display, on the display device, a propagation of the measurement signal emitted by the level measuring instrument on the basis of the parameter of the measurement signal emitted by the level measuring instrument, the dimension of the container, the position of the level measuring instrument relative to the container, and the angle of inclination of the level measuring instrument.

7. The portable device according to claim 6, wherein the device is configured to determine the parameter of the measurement signal emitted by the level measuring instrument by means of an input of a serial number of the level measuring instrument or by scanning a code, the code including a barcode or a QR code.

8. The portable device according to claim 1, wherein the tilt sensor is an accelerometer.

9. The portable device according to claim 1,
wherein the dimension of the container comprises a height of the container, and
wherein the position of the level measuring instrument relative to the container comprises a distance of the level measuring instrument from a center axis of the container.

10. The portable device according to claim 1, further comprising:
an input device, and
wherein the processor is further configured to determine the dimension of the container and the position of the level measuring instrument relative to the container by means of an input into the input device.

11. The portable device according to claim 1, wherein the processor is further configured to determine the dimension of the container and/or the position of the level measuring instrument relative to the container by scanning a code, the code including a barcode or a QR code.

12. The portable device according to claim 1, wherein the portable device is a mobile terminal.

13. A portable device for orienting a level measuring instrument on a container, comprising:
a processor;
a tilt sensor;
a display device; and
a control element,
wherein the control element is configured to actuate a function for determining an angle of inclination to be set for the level measuring instrument, and
wherein the processor is configured to:
determine an inclination of the level measuring instrument by using the tilt sensor to determine an inclination of the device when the device is placed onto a surface of the level measuring instrument or of a mounting device for the level measuring instrument,
perform the function to determine the angle of inclination to be set for the level measuring instrument,
determine a required alteration in an orientation of the level measuring instrument on the basis of the angle of inclination to be set of the level measuring instrument and the inclination of the level measuring instrument, and
transmit to the display device a signal to output the determined required alteration in the orientation of the level measuring instrument.

14. The portable device according to claim 13, further comprising:
a camera configured to capture an image,
wherein the processor is further configured to:
generate in the captured image a target marker to aim at a desired point of the container,
transmit to the display device a signal to display the captured image containing the target marker, and
apply, on actuation of the control element, a current angle of inclination of the portable device as the angle of inclination to be set.

15. A level measuring system, comprising:
the portable device according to claim 1; and
a level measuring instrument,
wherein the level measuring instrument includes a mounting device for the portable device.

16. The portable device according to claim 13, wherein the portable device is a mobile terminal.

17. A method for using a portable device to orient a level measuring instrument on a container, comprising:
determining, by the portable device, a dimension of the container and a position of the level measuring instrument relative to the container when the portable device is placed onto a surface of the level measuring instrument or of a mounting device for the level measuring instrument, or determining, by the portable device, an angle of inclination to be set for the level measuring instrument on the container when the portable device is placed onto a surface of the level measuring instrument or of a mounting device for the level measuring instrument;
determining, by the portable device, an angle of inclination of the level measuring instrument in order to measure an angle of inclination, the portable device touching the level measuring instrument;
determining, by the portable device, an alteration in an orientation of the level measuring instrument on the basis of the dimension of the container, the position of the level measuring instrument relative to the container and the angle of inclination of the level measuring instrument, or on the basis of the angle of inclination to be set and the angle of inclination of the level measuring instrument; and outputting, by the portable device, the determined alteration in the orientation of the level measuring instrument.

18. The method according to claim 17, wherein the portable device is a mobile terminal.

19. A nontransitory computer-readable storage medium having stored therein a program, which when executed on a processor of a portable device for orienting a level measuring instrument on a container, instructs the portable device to perform steps comprising:

determining, by the portable device, an angle of inclination to be set for the level measuring instrument on the container;

determining an angle of inclination of the level measuring instrument in order to measure an angle of inclination, the portable device touching the level measuring instrument, when the portable device is placed onto a surface of the level measuring instrument or of a mounting device for the level measuring instrument;

determining an alteration in an orientation of the level measuring instrument on the basis of the dimension of the container, the position of the level measuring instrument relative to the container and the angle of inclination of the level measuring instrument, or on the basis of the angle of inclination to be set and the angle of inclination of the level measuring instrument; and outputting the determined alteration in the orientation of the level measuring instrument.

* * * * *